United States Patent
Dimitri et al.

(10) Patent No.: US 6,574,424 B1
(45) Date of Patent: Jun. 3, 2003

(54) METHOD AND APPARATUS FOR A RANDOMIZER FOR DVD VIDEO

(75) Inventors: Kamal E. Dimitri, Tucson, AZ (US); Rodney J. Means, Tucson, AZ (US); John E. Kulakowski, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,745

(22) Filed: Jun. 25, 1999

(51) Int. Cl.⁷ .......................... H04N 5/781; H04N 5/85
(52) U.S. Cl. ..................................... 386/125; 386/126
(58) Field of Search .............................. 386/125–126, 386/95, 68; H04N 5/781, 5/85

(56) References Cited

U.S. PATENT DOCUMENTS

| | | | |
|---|---|---|---|
| 4,481,571 A | * 11/1984 | Pitat et al. | 712/221 |
| 4,845,697 A | * 7/1989 | Giddings | 369/30.16 |
| 5,553,864 A | 9/1996 | Sitrick | 463/31 |
| 5,624,265 A | * 4/1997 | Redford et al. | 434/307 R |
| 5,708,478 A | 1/1998 | Tognazzini | 348/552 |
| 5,734,788 A | 3/1998 | Nonomura et al. | |
| 5,771,334 A | 6/1998 | Yamauchi et al. | 386/95 |
| 5,784,528 A | 7/1998 | Yamane et al. | 386/112 |
| 5,786,845 A | 7/1998 | Tsuria | 348/9 |
| 5,805,537 A | 9/1998 | Yamamoto et al. | |
| 6,040,843 A | * 3/2000 | Monroe et al. | 345/507 |
| 6,157,769 A | * 12/2000 | Yoshimura et al. | 386/68 |
| 6,208,801 B1 | 3/2001 | Kambayashi et al. | |
| 6,434,326 B1 | * 8/2002 | Kondo et al. | 386/125 |

FOREIGN PATENT DOCUMENTS

| | | |
|---|---|---|
| EP | 0 920 006 A2 | 6/1999 |
| EP | 0 920 017 A2 | 6/1999 |
| JP | 2-128360 | 5/1990 |
| JP | 8-096505 | 4/1996 |
| JP | 10-026990 | 1/1998 |
| JP | 10-074382 | 3/1998 |
| JP | 10-307741 | 11/1998 |
| WO | WO 97/07509 | 2/1997 |

\* cited by examiner

*Primary Examiner*—Vincent Boccio
(74) *Attorney, Agent, or Firm*—Douglas R. Millett; Bracewell & Patterson, L.L.P.

(57) ABSTRACT

A bit is provided in each Digital Video Disk memory sector header to indicate the type of information contained in the main data portion of the frame. A vector of video clips are stored on the DVD disk and the DVD drive examines the bit to determine whether to play a movie or to employ logic provided by the present invention that allows the DVD drive to determine which included video clip to play instead. The video clips may include cartoons, commercials, movie previews, etc. and the logic employed by the DVD drive allows for random or specific selections to be played at predetermined times, such as displaying a clip during the flipping process of a dual-sided DVD disk. Additionally, the method and apparatus may be applied to DVD disks to determine whether commercials are played before, after or during the movie or the movie is played commercial free.

24 Claims, 6 Drawing Sheets

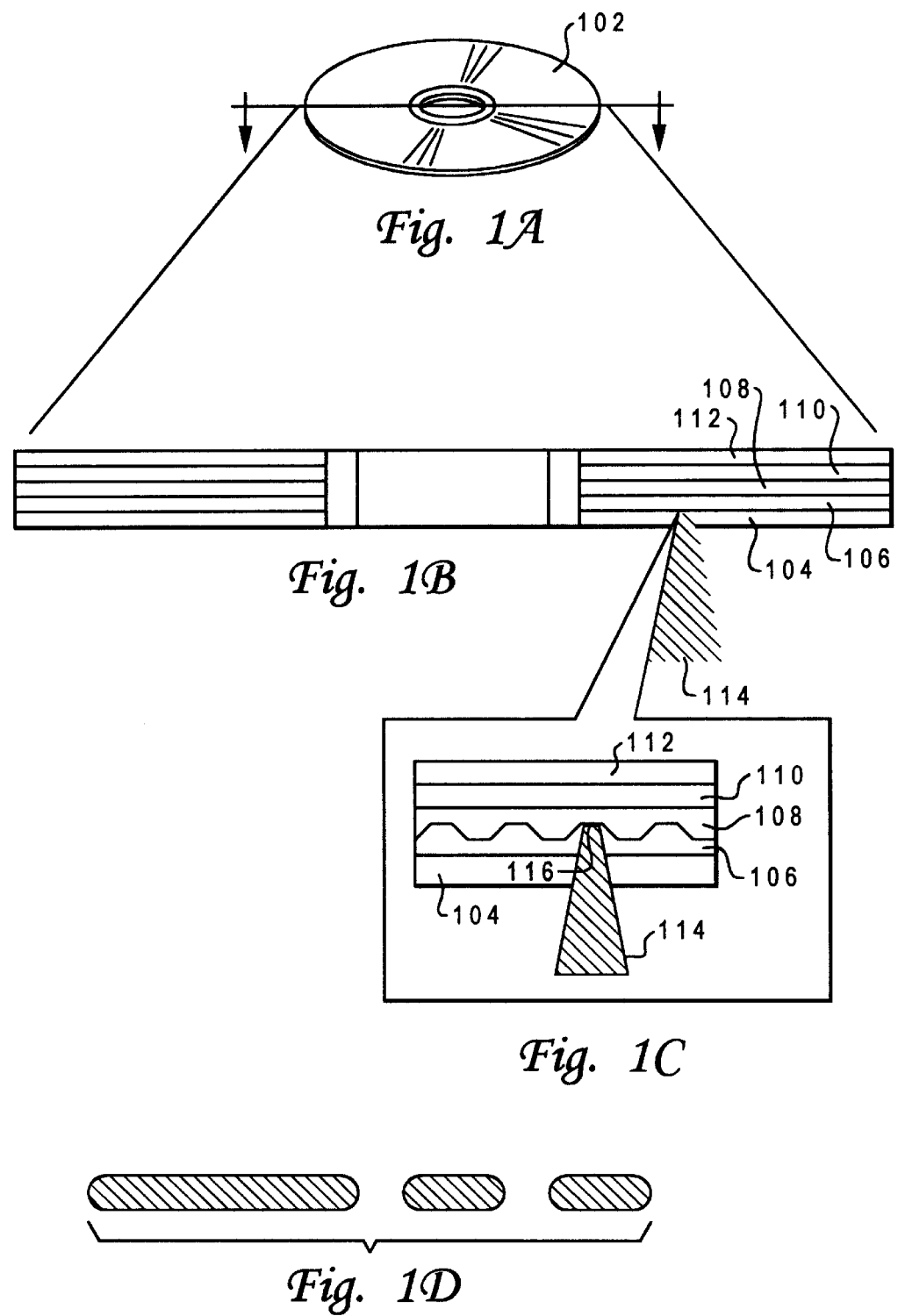

| SECTOR HEADER AREA | USER DATA AREA | ERROR CORRECTION CODE STORAGE AREA |

# METHOD AND APPARATUS FOR A RANDOMIZER FOR DVD VIDEO

BACKGROUND OF THE INVENTION

1. Technical Field

The present invention relates in general to an optical disc onto which an information signal is recorded and to a reproduction apparatus for the disc. More particularly, the present invention relates to an optical disc used for recording multimedia data such as digital video data, audio data and graphics data and to a reproduction apparatus for the optical disc.

2. Description of the Related Art

A Digital Video Disk (DVD), also known as Digital Versatile disk, is a type of optical data storage disk that utilizes a low power laser to read data from the disk. DVDs have much more storage capacity than Compact Disk-Read Only Memory (CD ROM) optical disks and may be used to store video, audio and digital data. CD ROMs typically hold approximately 650 megabytes of data. DVDs store, depending on the configuration, anywhere from 4.7 Gigabytes (GB) up to 17 GB of data (utilizing dual-layer, dual-sided disk).

DVDs, because of storage capacity, are quite suitable for storing videos or movies. It requires about two gigabytes of space to store one hour of an average video recording. Even though dual layer technology provides storage space for over four hours of playback, some movies are divided and recorded on both sides of a disk. This requires that the consumer "flip" (pull out the disk, turn it over and re-insert the disk into the player) the DVD during the movie. All dual-sided disks may be flipped manually or automatically in a robotically serviced library to access all the information contained on both sides, including DVD-10 and DVD-17.

TABLE 1

| DVD-ROM | Single-layer | Dual Layer |
|---|---|---|
| Single-sided | DVD-5 (4.7 GB) | DVD-9 (8.5 GB) |
| Dual-sided | DVD-10 (9.4 GB) | DVD-17 (17 GB) |

Currently, DVD movies may have additional video programs installed on the disk for playing before the feature. Typically, all the additional programs must be viewed in order or, depending on the capabilities of the DVD player, the additional programs may be manually skipped and the movie played at the discretion of the viewer. For instance, an additional program may be an advertisement and the advertisement may be outdated by the time the viewer is able to view the movie (for instance a winter related commercial viewed in summertime).

It would therefore, be desirable to improve DVDs to provide cartoons, video clips, commercials, movie trailers, etc., which could be selected at random and played before the main movie. Additionally, it would be desirable to provide a display that occurs when a dual-sided DVD is "flipped". Further, it would be desirable to provide a method and apparatus that would provide an option to display commercials prior to a Divx DVD to reduce the cost of the disk or play the Divx DVD movie commercial free.

SUMMARY OF THE INVENTION

It is therefore one object of the present invention to provide a method and system that automatically plays particular video programs, stored on a DVD along with a movie, at specific times or in conjunction with the movie.

It is another object of the present invention to provide a method and system for automatically displaying a stored video clip during flipping of a DVD.

It is yet another object of the present invention to provide a method and apparatus for displaying commercials to reduce the cost of a Divx version DVD disk.

It is another object of the present invention to provide a method and apparatus that will randomly select and play video clips stored on the DVD disk.

The foregoing objects are achieved as is now described. A bit is provided in each Digital Video Disk memory sector header to indicate the type of information contained in the main data portion of the frame. A vector of video clips are stored on the DVD disk and the DVD drive examines the bit to determine whether to play a movie or to employ logic provided by the present invention that allows the DVD drive to determine which included video clip to play instead. The video clips may include cartoons, commercials, movie previews, etc. and the logic employed by the DVD drive reads the bit allows for random or specific selections to be played at predetermined times, such as displaying a clip during the flipping process of a dual-sided DVD disk. Additionally, the method and apparatus may be applied to Divx DVD disks to determine whether commercials are played before, after or during the movie or the movie may be played commercial free.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1E:
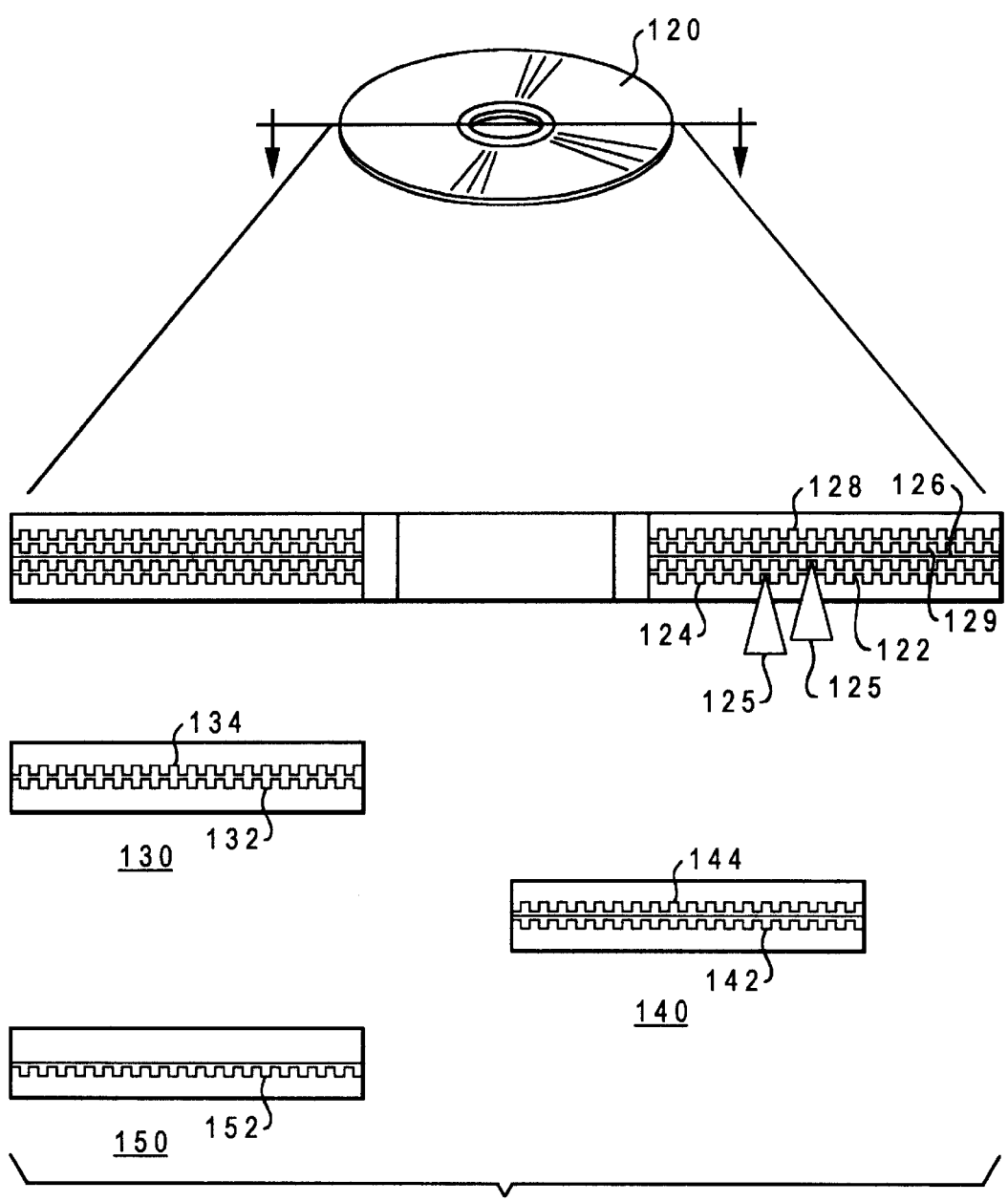
FIG. 1 depicts a high-level block diagram of a data processing system in which a preferred embodiment of the present invention may be implemented.

With reference now to the figures, and in particular with reference to FIG. 1A–1D, a diagram of the physical construction of an optical disk, in which a preferred embodiment of the present invention may be implemented is depicted. FIG. 1A depicts a perspective of the optical disk, FIG. 1B illustrates a cross-section of the disk, and FIG. 1C depicts an enlargement of the boxed section of FIG. 1B. FIG. 1D illustrates a typical arrangement of pits formed in the information layer.

Beginning with FIG. 1A, the optical disk, in this instance a single-sided Digital Video Disk (DVD) 102, typically has a diameter of 120 mm and a storage capacity of 4.7 GB on one side. FIG. 1B illustrates a cross-section of DVD 102 and is fabricated of a first transparent substrate 104, an information layer 106, a bonding layer 108, a second transparent substrate 110 and a print layer 112 for printing a label.

The first transparent substrate 104 and the second transparent substrate 110 are reinforcing substrates which are made of a same material and are around typically 0.5–0.7 mm thick. Bonding layer 108 is provided between information layer 106 and the second transparent substrate 110 to bond them together.

Information layer 106 includes a reflective membrane, such as metal foil, which is attached to the first transparent substrate 104. A high density of indented and protruding pits is formed in this reflective membrane by a manufacturing process. The shape of these pits is shown in FIG. 1D.

FIG. 1C is a magnified view of a portion of DVD 102 from FIG. 1B showing laser beam 114 impinging on information layer 106 of DVD disk 102. Directing laser beam 114, typically generated by a short wavelength, red semiconductor laser, to the information layer 106 and measuring changes in the reflection ratio of the light spot 116 from pits in information layer 106 allows information to be retrieved from DVD 102.

Light spot 116 diameter in a DVD system typically measures sixty percent of a light spot in a conventional CD disk. DVDs similar to the one described may store over 4 gigabytes (GB) of information on one side, or about 8 times the capacity of a conventional CD.

FIG. 1D illustrates the shapes of the pits present on information layer 106. As shown, the pits vary in length, typically, between 0.4 micro-meters (um) and 2.13 um with the pits aligned in a spiral track having radial intervals of, usually, 0.74 um between the pits. The spiral track (not shown) is radially formed leading from the inner periphery to the outer periphery of information layer 106, having a very large number of sectors being formed in this spiral track. A sector is a curved area of the spiral track and is the smallest unit of data which can be reliably addressed.

Referring to FIG. 1E, block diagrams of types of DVD construction in accordance with a preferred embodiment of the present invention are illustrated. DVD 120 is shown with a cross section illustrating a dual-sided, dual layer construction and is depicted with a DVD drive laser reading side A. Typically, as with CD-ROMs, the thickness of the dual-sided, dual layer DVD is 1.2 mm, made up of two 0.6 mm substrates bonded together at 126. Each substrate has two layers so that there are four laser-readable layers. Layer 122 is deposited followed by a clear polymer layer and layer 124 is a semi-transparent layer. The DVD laser 125 reads information on layer 124 until it reaches the end of layer 124. Then, laser 125 changes focus and reads the information from layer 122 through semi-transparent layer 124. To read information contained in layers 128 and 129, the DVD is manually removed, "flipped" and re-inserted. Laser 125 then reads layers 128 and 129.

DVD block diagram 130 depicts a dual layer, single sided disk. Layer 132 is a semi-transparent layer that is read first and layer 134 is another layer which is read after reading of layer 132 complete. DVD block diagram 140 illustrates a single-layer, dual-sided disk. Layer 142 is read and flipped to read the information contained in layer 144. In DVD block diagram 150, a single-layer DVD is illustrated in which only layer 152 is read and no flipping is required. As depicted in Table 1, the capacity of DVDs varies greatly from 4.7 GB for a single layer single-sided disk, to 17 GB for a dual-side, dual-layer disk.

Figures 2A, 2B:
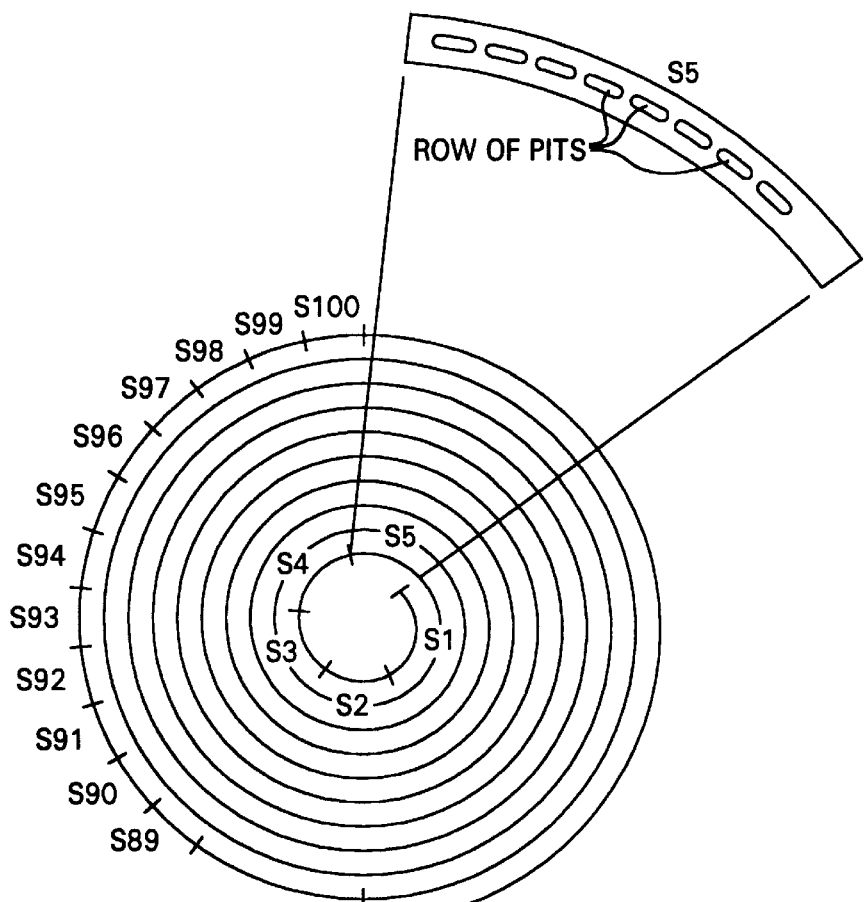
FIG. 2A and 2B illustrates a high-level diagram of recorded track on a DVD disk and information structure in accordance with a preferred embodiment of the present invention.

Referring now to FIG. 2A, a high-level diagram of recorded track on a DVD disk in accordance with a preferred embodiment of the present invention, is illustrated. The arrangement of a spiral track, containing video data information, on the DVD is shown leading from the inner periphery to the outer periphery of the information layer. A very large number of physical sectors, designated by S1, S2, S3, etc., are formed on the spiral track. Each sector has the logical structure as shown in FIG. 2B, including a sector header used to identify the respective sector, data area for storing data, and an error correction code storage area directed at the data in the same sector. The error correction code is used to detect any errors in the sector, and performs error correction when such errors are detected.

Figure 3:
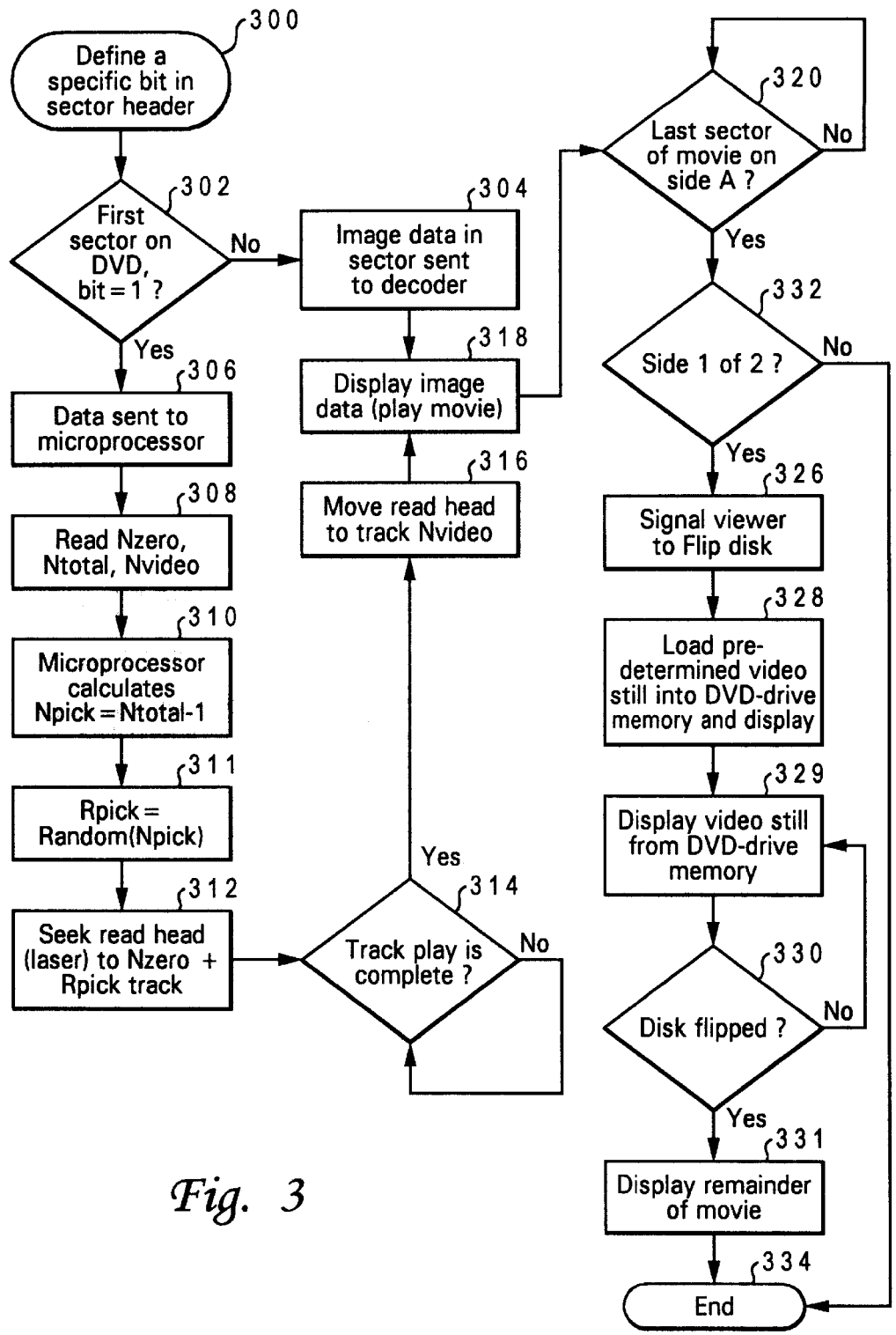
FIGS. 3 depicts a high-level flow diagram of a method for displaying an optional, stored video program in accordance a preferred embodiment of the present invention.

Referring to FIG. 3, a high-level flow diagram of a method for displaying an optional, stored video program in accordance with a preferred embodiment of the present invention, is depicted. The process begins with step 300, which depicts placing a trigger bit in sector headers on the DVD disk. Zero value of the bit indicates that the sector contains image data and a value of one indicates the sector contains either arguments for microcode functions or microcode itself.

The process proceeds to step 302, which illustrates a determination of whether the bit value is one. If the bit value is not one (i.e., zero), the process proceeds to step 304, which illustrates image data contained in the data portion of the sector is sent to a video decoder (i.e., MPEG decoder) for display on a video screen. If the bit value is one, contents of the sector is either argument(s) (see Table 2) for microcode functions or microcode itself and the process proceeds instead to step 306, which depicts sending the contents to a microprocessor.

TABLE 2

| Microcode Argument | Definition |
|---|---|
| Nzero | First track containing a commercial, cartoon or trailer |
| Ntotal | Number of tracks containing commercials, cartoons, or trailers |
| Nvideo | First track of the movie |
| Fast_Forward_disable | Temporarily disables fast forward of DVD drive; viewers cannot fast forward through commercials. |

The process next passes to step 308, which illustrates reading argument values stored on the DVD, where Nzero is the first track containing a commercial, Ntotal is the total number of tracks containing commercials and Nvideo is the first track of a movie. The process continues to step 310, which depicts the microprocessor calculating Npick which is a number between zero and Ntotal. The method of deciding which number to select is predetermined by microcode in the DVD drive or microcode on a DVD disk, either of which may select between commercials, cartoons, etc. This method may include a random pick, may base the number selected on a time of day (i.e., playing a food commercial around meal time) or base the number selected on time of year (playing a swimsuit commercial in summer and not in winter). Certain material might not be shown before a certain date, such as a trailer for a new movie.

The process next passes to step 311, which illustrates calculating Rpick utilizing the equation $$Ripick = RANDOM(Npick).$$

Rpick is a variable utilized to derive a random number for selecting a particular clip from the stored material on the DVD disk. The RANDOM function is a function that picks a number using Npick as its argument. Rpick varies randomly between 0 and Npick which is illustrated in equation form:

$$0 <\!or\!= Rpick <\!or\!= Npick.$$

Rpick is calculated by the DVD drive using the RANDOM function and the argument (Npick) for the RANDOM function is retrieved from the DVD disk when the trigger bit=1. A random pick from the DVD disk of a commercial or video clip is the preferred method.

The goal is to make DVD movies more of an entertainment experience. If a different cartoon was played each time a DVD movie was shown, that might spark viewer interest. Also, viewers might not skip or fast forward through commercials if the commercial changed from each time the DVD disk is viewed or was interspersed with a cartoon.

The process then passes to step 312, which illustrates the DVD player seeking the read head (laser) to the track determined as Nzero+Rpick. The process continues to step 314, which depicts a determination of whether the Nzero+Rpick track play is complete. If the track play is not complete, the process returns to step 314 and repeats the determination. If the track play is complete, the process then proceeds to step 316, which illustrates moving the read head to Nvideo track. The process passes to step 318, which depicts displaying image data (playing the movie). A never changing commercial may be inserted prior to the movie. Thus, (a) track Nzero+Rpick is the initial, randomly selected commercial and (b) track Nvideo includes a never-changing commercial immediately preceding the movie.

The movie is played until it reaches the end of the DVD on side A. If the movie is stored on a single sided disk, the movie terminates and a trailing commercial could then be played. Depending on the functions programmed by the manufacturer, the drive may randomize the commercial played at the end of the movie.

If the movie is stored on both sides, A and B, of a double sided disk, the DVD disk must be flipped (removed and reinserted upside down). During that dead time, instead of a blank screen the present invention provides a billboard type still image or a short animated commercial read once off the DVD disk before it is flipped and then replayed from memory, which could include RAM, hard disk drive, etc., in the DVD drive to the display screen. The replay continues until the flipped DVD begins play on side B.

The process continues from step 318 to step 320, which illustrates a determination of whether the last sector played is the last sector on side A. If the sector is not the last sector, the step repeats by returning to step 320. If the sector is the last sector on side A, the process moves to step 322, which depicts a determination of whether there is a side B to the DVD disk. If there is no side B to the DVD disk, the process proceeds to end step 334, which illustrates the DVD signaling the end of the movie. If there is a side B, the process passes to step 326, which depicts the DVD signaling the viewer to flip the disk. Next the process proceeds to step 328, which illustrates the DVD loading a predetermined still image or short video feature or commercial to DVD drive memory. The process continues to step 329, which depicts the DVD drive displaying the still image or video feature on a viewing screen. The image remains on the screen until the DVD is re-inserted. The process next passes to step 330, which illustrates a determination of whether the DVD disk has been flipped. If the disk has not been flipped the process returns to step 329 and replays the same individual still or string of stills or short video features. If the disk has been flipped the process proceeds instead to step 331, which depicts the DVD drive playing the remainder of the movie.

Commercials, cartoons, movie trailers or other short video clips are stored on the same DVD disk that holds a DVD movie. The DVD player (or drive) utilizing code stored in the DVD player and/or code stored on the DVD disk, randomly picks from the stored commercials, cartoons, etc., to add some variation to the presentation of the movie. If the movie is a children's movie, commercials and cartoons would have a child's theme and if the movie is more of an adult movie, the video clips would probably be more adult oriented. After playing the short videos, the DVD drive skips to the main movie.

Storing a commercial on a DVD disk lessens the cost of disk production. Storing a vector of commercials could lessen the fee paid by each advertising company. For example, if there was space for 10 commercials, each commercial would be one tenth the total cost of buying the total advertising space. Each company purchasing advertisements on the DVD would have a proportional chance of its advertising being shown during any one viewing of the DVD movie. Purchasing more advertising slots on the DVD would increase the probability of that company's commercial(s) being shown.

A variation of DVD is Divx (formerly ZoomTV). Divx is a pay-per-viewing period disc. A Divx DVD player is connected to a telephone line and the player dials a number (typically an 800 number) and uploads billing information concerning Divx movies played on the player during the month. There is a purchase price that allows the viewer to view the movie during a specified period (usually 48 hours). The next time the Divx movie is viewed a reduced price is usually charged for a similar specified period.

A variation on the present invention involves providing a vector of commercials on a Divx disc and an access code whereby the viewer may skip commercials. This code allows for commercial-less viewing, but a higher rate is charged. If the lower rate is desired and commercials may be randomly displayed according to scheme of the present invention, there is no action necessary.

Figure 4:
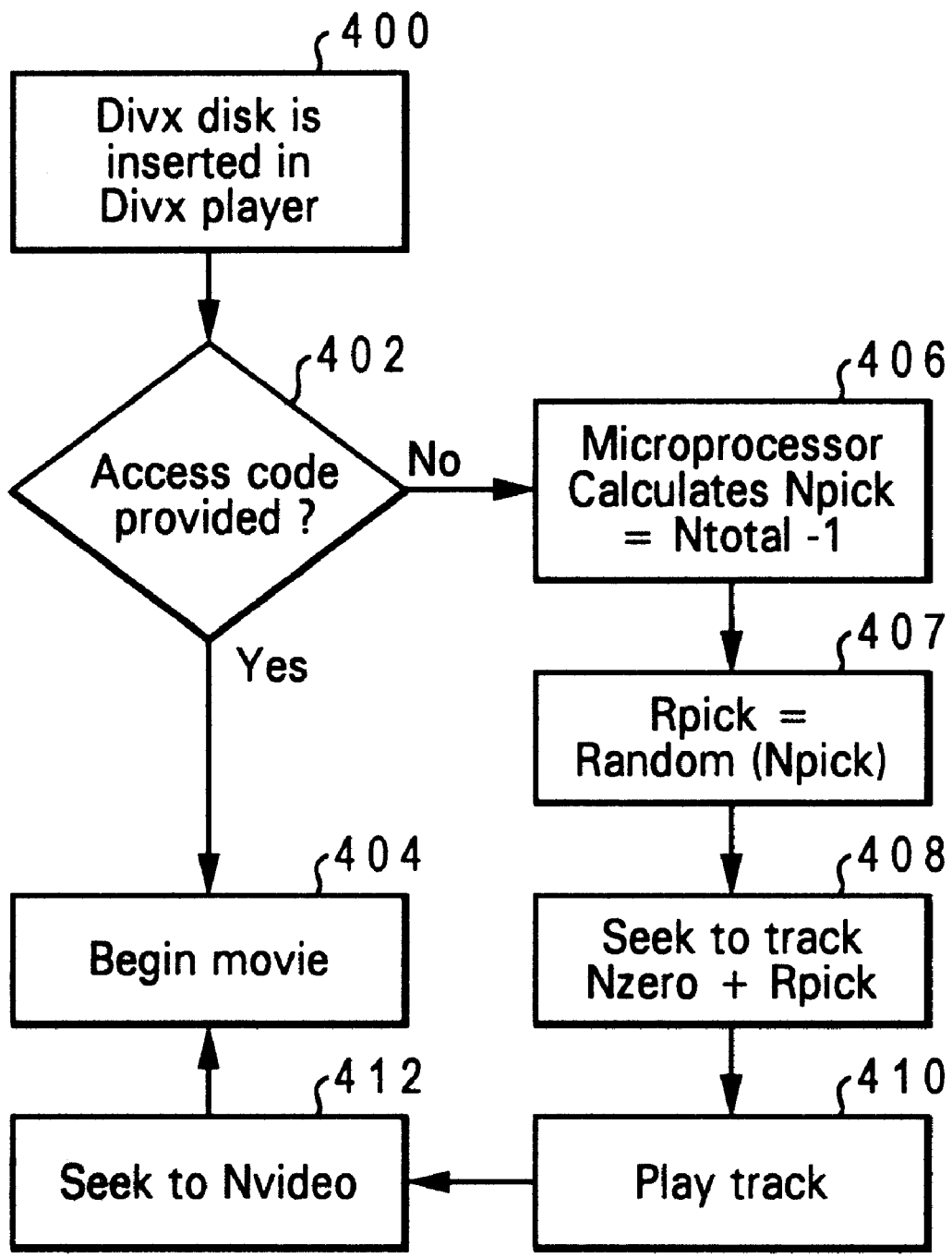
FIG. 4 illustrates a method for commercial free viewing on a Divx DVD disc according to an embodiment of the present invention.

Referring to FIG. 4, a method for commercial free viewing on a Divx DVD disc according to an embodiment of the present invention is illustrated. The process begins with step 400, which depicts a Divx disk being inserted into a Divx player. The process proceeds to step 402, which illustrates a determination of whether an access code has been entered. The viewer obtains the access code by calling the billing center and obtaining a commercial free access code. If the code is entered into the Divx player, the process proceeds to step 404, which illustrates beginning the movie without displaying commercials. If there is no access code entered, the process proceeds instead to step 406, which depicts the Divx player receiving arguments as disclosed in FIG. 3, and calculating Npick as Ntotal−1. The process next passes to step 407, which depicts calculation of Rpick using the equation Rpick=Random(Npick). The process continues to step 408, which illustrates the Divx player seeking to track Nzero+Rpick. Next, the process moves to step 410, which depicts the Divx player playing the track Nzero+Rpick. The process then passes to step 412, which illustrates the Divx read head seeking to Nvideo track. Next the process proceeds to step. 404 which depicts the Divx player playing the movie.

Figure 5:
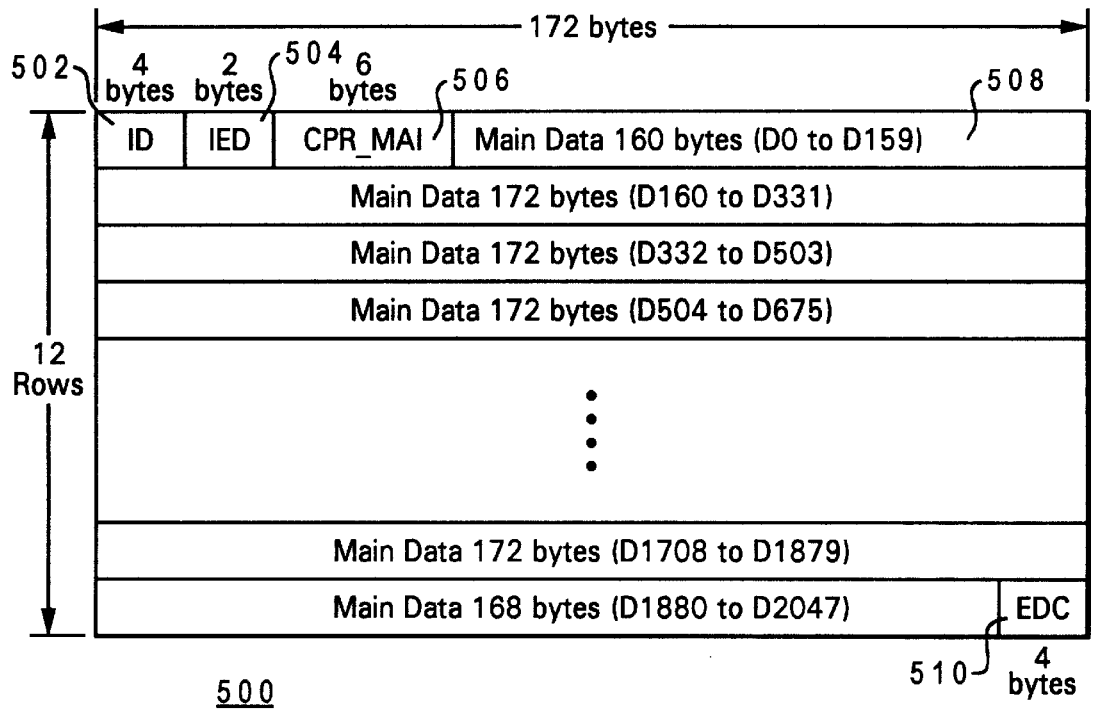
FIG. 5 depicts a high-level block diagram of a formatted Data frame as recorded onto a DVD ROM in accordance with a preferred embodiment of the present invention.
Figure 5:
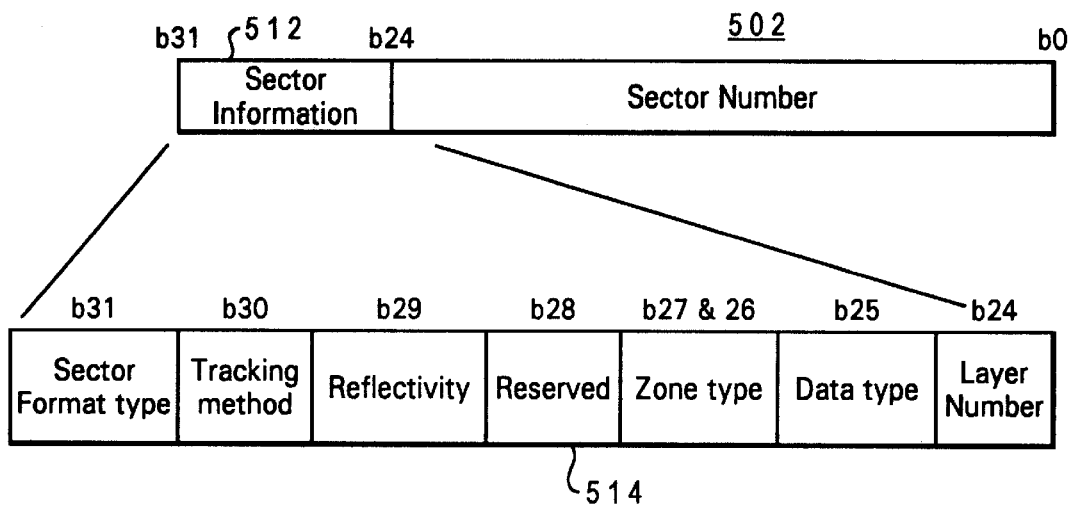

FIG. 5, a high-level block diagram of a formatted Data frame as recorded onto a DVD ROM in accordance with a preferred embodiment of the present invention is depicted. Data frame 500 consists of 2,064 bytes arranged in an array of 12 rows each containing 172 bytes. The first row of data begins with three fields: Identification Data (ID) 502, ID Error Detection code (IED) 504 and Copyright Management Information ($CPR_{13}$ MAI) 506 followed by 160 bytes of main data 508. The next ten rows contain main data 508 followed by Error Detection Code (EDC) 510.

ID 502 its shown divided into sector information. 512 and sector number 514. Further, sector information 512 contains bits b31, b30, b29, b28, etc. b28 is considered a reserved bit but is utilized in the present invention as a trigger bit for determining whether or not the sector contains image data (bit=0) or instructions for the DVD drive microprocessor (bit=1).

The present invention, as applied to a DVD, provides a method for selectively displaying either random or time designated material in the form of video clips (programs) that were stored on the DVD at manufacture. Additionally, the present invention provides a display between flipping a dual-sided DVD. Further, a Divx DVD movie disk may be played commercial free, at a cost, or with commercials to reduce cost.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for displaying video data in a Digital Video Disk (DVD) player, said method comprising:
   storing a plurality of predetermined video programs including a movie on board a DVD disk;
   defining a trigger bit in each data frame on board said DVD disk by:
      defining a first bit value to indicate contents of said data frame is image data; and
      defining a second bit value to indicate contents of said data frame is an argument for microcode functions;
   upon beginning display of said DVD disk, automatically choosing one of said plurality of predetermined video programs or said movie; and
   responsive to instructions from microcode if said second bit value detected, continuously replaying a predetermined still image or short video from DVD drive memory, wherein said instructions provide that said continuous replay is activated only during flip of the DVD disk.

2. The method of claim 1, wherein automatically choosing one of said plurality of predetermined video programs or said movie, further comprises:
   determining a first value, determined from the equation Rpick=RANDOM(Npick) where RANDOM is a function for picking a number and Npick is an argument for said RANDOM function;
   seeking to track number Nzero+Rpick and playing that track, where Nzero is a first track containing one of said predetermined video programs; and
   playing said movie upon completing playing of said track number.

3. The method of claim 1, wherein defining said second bit value to indicate contents of said data frame is an argument for microcode functions further comprises:
   in the alternative, defining said second bit value to indicate said contents of said data frame is microcode.

4. The method of claim 3, further comprising:
   sending said data frame to a video decoder for immediate display if said first value of said trigger bit is detected; and
   sending said data frame to a microprocessor for processing if said second value of said trigger bit is detected.

5. The method of claim 3, wherein defining said second bit value to indicate said contents of said data frame, further comprises:
   randomly picking a number in a range between zero and Ntotal−1, wherein Ntotal is a total number of tracks containing said predetermined video programs.

6. The method of claim 5, wherein picking said number is based on a time of day.

7. The method of claim 5, wherein picking said number is alternatively based on a time of year.

8. The method of claim 1, further comprising:
   inserting a commercial video clip immediately prior to said movie that will play each time said movie is played.

9. An apparatus for displaying video data in a Digital Video Disk (DVD) player, said apparatus comprising:
   storage means for storing a plurality of predetermined video programs including a movie on board a DVD disk;
   logic means for defining a trigger bit in each data frame on board said DVD disk by:
      argument means for defining a first bit value to indicate contents of said data frame is image data; and
      argument means for defining a second bit value to indicate contents of said data frame is an argument for microcode functions;
   display means for showing said predetermined video programs;
   logic means for automatically choosing one of said plurality of said predetermined video programs or said movie, upon beginning display of said movie; and
   means for continuously replaying a predetermined still image or short video from DVD drive memory, wherein said instructions provide that said continuous replay is activated only during flip of the DVD disk.

10. The apparatus of claim 9, further comprises:
   logic means for determining a first value, determined from the equation Rpick=RANDOM(Npick) where RANDOM is a function for picking a number and Npick is an argument for said RANDOM function;
   laser reading means for seeking to track number Nzero+Rpick and playing that track, where Nzero is a first track containing one of said predetermined video programs; and
   logic means for determining the completion of playing said track number and then playing said movie.

11. The apparatus of claim 9, wherein defining said second bit value to indicate contents of said data frame is an argument for microcode functions further comprises:

in the alternative, logic means for defining said second bit value to indicate said contents of said data frame is microcode.

12. The apparatus of claim 11, further comprising:

transmission means for sending said data frame to a video decoder for immediate display if said first value of said trigger bit is detected; and communication means for sending said data frame to a microprocessor for processing if said second value of said trigger bit is detected.

13. The apparatus of claim 11, wherein logic means for defining said second bit value to indicate contents of said data frame is an argument for microcode function, further comprises:

means for randomly picking a number in a range between zero and Ntotal−1, where Ntotal is a total number of tracks containing said predetermined video programs.

14. The apparatus of claim 13, wherein logic means for randomly picking said number in a range between zero and Ntotal−1 is based on a time of day.

15. The apparatus of claim 13, wherein logic for randomly picking said number in a range between zero and Ntotal−1 is alternatively based on a time of year.

16. The apparatus of claim 9, further comprising:

a commercial video clip immediately prior to said movie that will play each time said movie is played.

17. A computer program product with instructions in an instruction bearing medium for displaying video data in a Digital Video Disk (DVD) player, said computer program product comprising:

instructions within said instruction bearing medium for storing a plurality of predetermined video programs including a movie on board a DVD disk;

instructions within said instruction bearing medium for defining a trigger bit in each data frame on board said DVD disk by:

instructions within said instruction bearing medium for defining a first bit value to indicate contents of said data frame is image data; and instructions within said instruction bearing medium for defining a second bit value to indicate contents of said data frame is an argument for microcode functions;

instructions within said instruction bearing medium for automatically choosing one of said plurality of predetermined video programs or said movie upon beginning display of said movie; and instructions within said instruction bearing medium for continuously replaying a predetermined still image or short video from DVD drive memory, wherein said instructions provide that said continuous replay is activated only during flip of the DVD disk.

18. The computer program product of claim 17, wherein instructions for automatically choosing one of said plurality of predetermined video programs or said movie, further comprises:

instructions within said instruction bearing medium for determining a first value, determined from the equation Rpick=RANDOM(Npick) where RANDOM is a function for picking a number and Npick is an argument for said RANDOM function;

instructions within said instruction bearing medium for seeking to track number Nzero+Rpick and playing that track, where Nzero is a first track containing one of said predetermined video programs; and instructions within said instruction bearing medium for playing said movie upon completing playing of said track number.

19. The computer program product of claim 17, wherein instructions for defining said second bit value to indicate contents of said data frame is an argument for microcode functions, further comprises:

instructions within said instruction bearing medium for defining, in the alternative, said second bit value to indicate said contents of said data frame is microcode.

20. The computer program product of claim 19, further comprising:

instructions within said instruction bearing medium for sending said data frame to a video decoder for immediate display if said first value of said trigger bit is detected; and instructions within said instruction bearing medium for sending said data frame to a microprocessor for processing if said second value of said trigger bit is detected.

21. The computer program product of claim 19, wherein instructions within said contents of said data frame, further comprises:

instructions within said instruction bearing medium for randomly picking a number in a range between zero and Ntotal−1, where Ntotal equals a total number of tracks containing said predetermined video programs.

22. The computer program product of claim 21, wherein instructions within said instruction bearing medium for randomly picking said number is based on a time of day.

23. The computer program product of claim 21, wherein instructions within said instruction bearing medium for randomly picking said number is alternatively based on a time of year.

24. The computer program product of claim 17, further comprising:

instructions within said instruction bearing medium for inserting a commercial video clip immediately prior to said movie that will play each time said movie is played.

* * * * *